United States Patent
Sciarini

(10) Patent No.: US 6,561,371 B2
(45) Date of Patent: May 13, 2003

(54) SELF SEALING CAP

(75) Inventor: Gerald A. Sciarini, Solon, OH (US)

(73) Assignee: Impact Confections, Inc., Colorado Springs, CO (US)

( * ) Notice: Subject to any disclaimer, the term of this patent is extended or adjusted under 35 U.S.C. 154(b) by 0 days.

(21) Appl. No.: 09/874,448

(22) Filed: Jun. 4, 2001

(65) Prior Publication Data

US 2002/0003120 A1 Jan. 10, 2002

(51) Int. Cl.[7] ............................................. B65D 39/16
(52) U.S. Cl. ........................ 215/236; 215/313; 220/823; 222/516
(58) Field of Search .................. 215/236, 313, 215/315; 220/823; 222/516, 339

(56) References Cited

U.S. PATENT DOCUMENTS

| | | | | |
|---|---|---|---|---|
| 781,332 A | * | 1/1905 | Demacakos | 215/240 |
| 793,757 A | * | 7/1905 | Williamson | 215/313 |
| 1,021,452 A | * | 3/1912 | Craven | 222/387 |
| 1,404,883 A | * | 1/1922 | Murray | 222/516 |
| 1,612,719 A | * | 12/1927 | Haddad | 222/516 |
| 1,963,050 A | * | 6/1934 | Graham | 215/3 |
| 2,018,050 A | | 10/1935 | Bentley | |
| 2,533,915 A | * | 12/1950 | Brooks | 215/313 |
| 2,636,649 A | * | 4/1953 | Corriveau | 222/516 |
| 2,824,010 A | | 2/1958 | Petersen | |
| 3,355,067 A | | 11/1967 | Espinal | |
| 3,410,462 A | * | 11/1968 | Donovan | 222/516 |
| 3,413,128 A | | 11/1968 | Steinbarth et al. | |
| 4,914,748 A | | 4/1990 | Schlotter, IV et al. | |
| 5,027,986 A | | 7/1991 | Heinzel et al. | |
| 5,209,692 A | | 5/1993 | Coleman et al. | |
| 5,370,884 A | | 12/1994 | Coleman | |
| 5,386,909 A | | 2/1995 | Spector | |
| 5,391,107 A | | 2/1995 | Coleman | |
| 5,540,353 A | | 7/1996 | Coleman et al. | |
| 5,615,941 A | | 4/1997 | Shecter | |
| 5,758,802 A | | 6/1998 | Wallays | |
| 5,820,437 A | | 10/1998 | Coleman et al. | |
| 5,853,093 A | | 12/1998 | Neiger | |
| 5,921,425 A | * | 7/1999 | Markey | 215/236 |
| 5,993,870 A | | 11/1999 | Hoeting et al. | |
| 6,457,608 B1 | | 4/2000 | Manzone et al. | |
| 6,136,352 A | | 10/2000 | Silverstein et al. | |
| D436,549 S | | 1/2001 | Kosaan | |
| 6,332,551 B1 | * | 12/2001 | Copeland | 220/262 |

FOREIGN PATENT DOCUMENTS

| | | | | |
|---|---|---|---|---|
| HU | P9701393 | | 4/1999 | |
| IT | 496889 | * | 8/1954 | 215/313 |
| WO | WO 00/19803 A2 | | 4/2000 | |

OTHER PUBLICATIONS

Product photograph "Baby Bottle Pop Candy", the Topps Company, Inc., Duryea PA, No Date.

* cited by examiner

*Primary Examiner*—Jes F. Pascua
(74) *Attorney, Agent, or Firm*—Deborah A. Peacock; Jeffrey D. Myers; Katy C. Fain

(57) ABSTRACT

A self sealing rotating cap or lid for a bottle, container or other object. The cap comprises an aperture, a spring, a resting position and a rotatable open position.

25 Claims, 4 Drawing Sheets

SELF SEALING CAP

CROSS-REFERENCE TO RELATED APPLICATIONS

This application is related to U.S. Utility patent application entitled "Soda Bottle Confectionery," Ser. No. 09/874,440; "Confectionery With Body, Handle and Container," Ser. No. 09/874,446; and "Soda Bottle Confectionery With Open Top," Ser. No. 09/874,447; and to U.S. Design patent applications entitled "Alien Head for Confectionery Product," Serial No. 29/142,929; "Alien Head for Confectionery Product," Serial No. 29/142,928; "Alien Head for Confectionery Product," Serial No. 29/142,930; "Alien Head for Confectionery Product," Serial No. 29/142,932; and "Alien Body for Confectionery Product," Serial No. 29/142,921, all of which are filed concurrently on even date herewith, and the specifications and drawings thereof are incorporated herein by reference.

COPYRIGHTED MATERIAL

A portion of the disclosure of this patent document and of the related applications listed above contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention (Technical Field)

The present invention relates to a self sealing cap, useful particularly for bottles with confectionery products.

SUMMARY OF THE INVENTION (DISCLOSURE OF THE INVENTION)

The present invention is of a self sealing cap for covering and providing an opening to an object, the cap comprising: an object comprising an object opening therein; a cap assembly disposed on the object, the cap assembly comprising an aperture and a spring; the cap assembly and the object having a resting position wherein the object opening is closed; the cap assembly and the object having an open position when the object opening is opened through the cap assembly aperture; the cap assembly rotatable by a user exerting force on the cap assembly from the resting position about the object to align the object opening with the cap assembly aperture in the open position to allow material from the object to pass through both the object opening and the cap assembly aperture; and the spring providing automatic counter rotation of the cap assembly back to the original position to thereby close the object opening after the user removes force from the cap assembly. In the preferred embodiment, the object comprises a bottle and the object opening is the top of the object. The object opening may be to a side of a longitudinal axis of the object. The cap assembly may be integral with the object. The object opening is preferably circular, as is the cap assembly aperture. The cap assembly may be attached to the object. The cap assembly preferably further comprises a thumb wedge, wherein one end of the spring is disposed in the thumb wedge. The cap assembly may further comprise knurls, a central post around which the spring is disposed, and at least one rim upon which the spring is stopped in rotation. The cap assembly is preferably rotatable about a central axis of the cap, with the central axis of the cap being coaxial with a central longitudinal axis of the object. The spring is preferably housed in a recess in the cap assembly. A seal may be disposed between the object and the cap assembly, wherein the seal comprises an o-ring about the object opening.

The invention is also of a self sealing cap for covering and providing an opening to an object, the cap comprising: an object comprising an object opening therein; a cap assembly disposed on the object, the cap assembly comprising: a central axis; an aperture to a side of the central axis; a spring; a thumb wedge comprising one end of the spring disposed therein; at least one stop upon which rotation of the cap assembly is stopped; the cap assembly and the object having a resting position wherein the object opening is closed; the cap assembly and the object having an open position when the object opening is opened through the cap assembly aperture; the cap assembly rotatable about the central axis by a user exerting force on the thumb wedge from the resting position about the object to the stop to align the object opening with the cap assembly aperture in the open position to allow material from the object to pass through both the object opening and the cap assembly aperture; and the spring providing automatic counter rotation of the cap assembly back to another stop and the original position to thereby close the object opening after the user removes force from the thumb wedge. In the preferred embodiment, the object comprises a bottle and the object opening is a top of the object. The object opening may be to a side of a longitudinal axis of the object. The object opening is preferably circular, as is the cap assembly aperture. The cap assembly preferably further comprises a central post around which the spring is disposed.

The present invention is still further of a self-closing cap assembly for an opening in a container comprising: a cap assembly carried by the container including a rotatable cap having an aperture and a torsional spring; the cap assembly having a resting position wherein the container opening is closed and a dispensing position wherein the container opening is open; the cap movable by a user exerting force against the spring so as to move the cap from a resting position to an open position; and the spring rotating the cap back to the closed position when the user applies force less than a spring force. In the preferred embodiment, the cap additionally includes a thumb wing attached to one peripheral end of the cap for receiving rotational force from a user.

The object of the present invention is to provide a self sealing cap/lid for a container or other object.

Other objects, advantages and novel features, and further scope of applicability of the present invention will be set forth in part in the detailed description to follow; taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

BEST MODES FOR CARRYING OUT THE INVENTION

The present invention is a self sealing cap, particularly useful for bottles, containers, or other objects and most particularly useful for flowable confectionery bottles, such as disclosed in co-pending application entitled "Soda Bottle Confectionery with Open Top," filed concurrently and on even date herewith and incorporated herein by reference.

Figure 1:
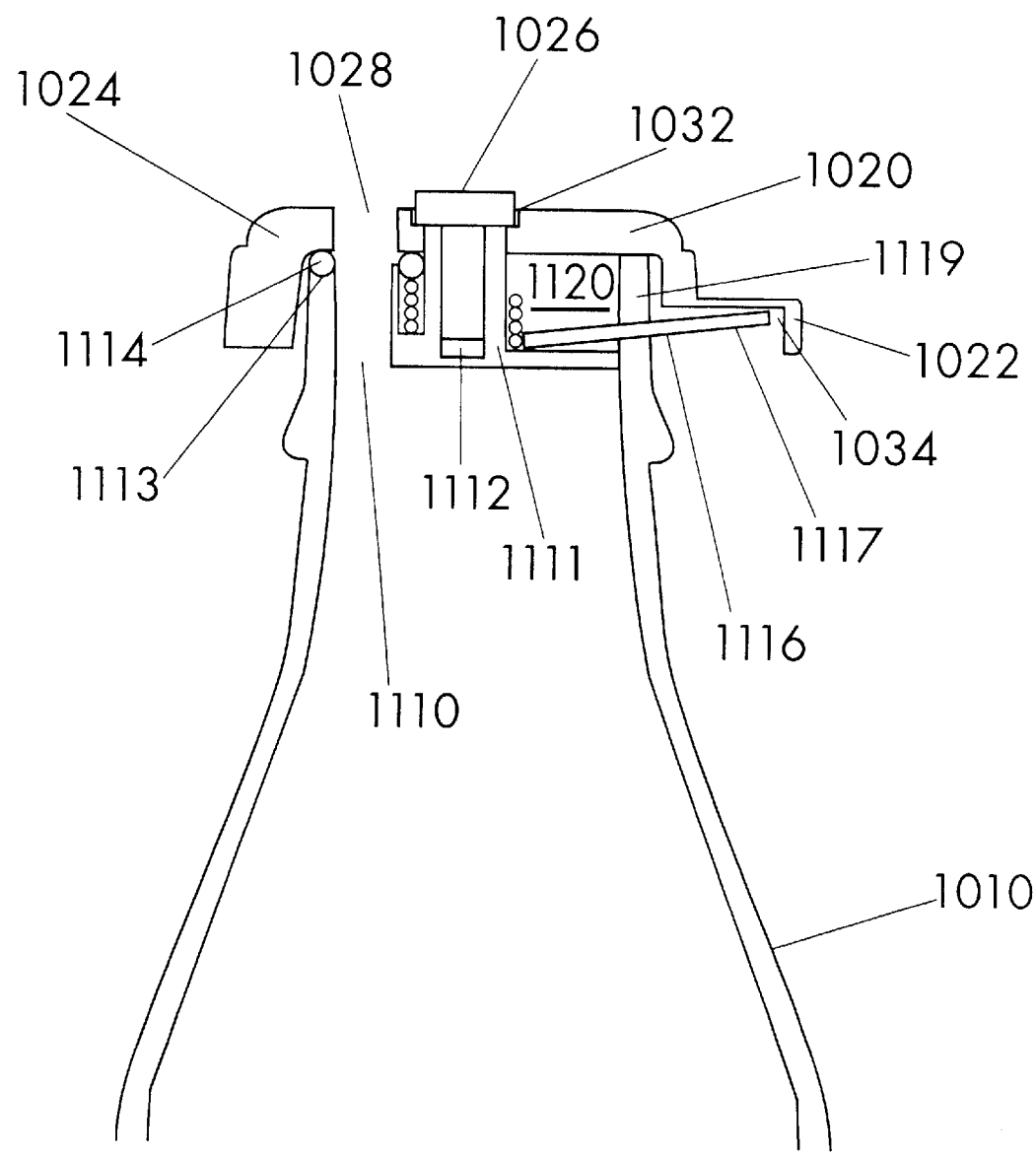
FIG. 1 is a side view of a bottle with the preferred self sealing cap assembly of the present invention.

FIG. 1 is a side view of a bottle-shaped container 1010 of the present invention. FIGS. 1–4 show the preferred cap 1020 of the present invention.

The preferred embodiment of the present invention comprises a rotating cap 1020 on bottle 1010 or other object, as shown in the drawings. Cap 1020 is part of a cap assembly. Cap 1020 comprises a central aperture 1032 to fix cap 1020 to bottle 1010. A screw 1026 passes through central aperture 1032. Alternatively, cap assembly is integral with the bottle or other object. Cap 1020 is rotatable about a central axis of screw 1026, which is preferably, but optionally coaxial with the longitudinal axis of bottle 1010. Rotatable cap 1020 further comprises an off-center aperture 1028 that is positioned to allow for removal of material (e.g., a flowable liquid or confectionery) from bottle 1010.

Figure 2:
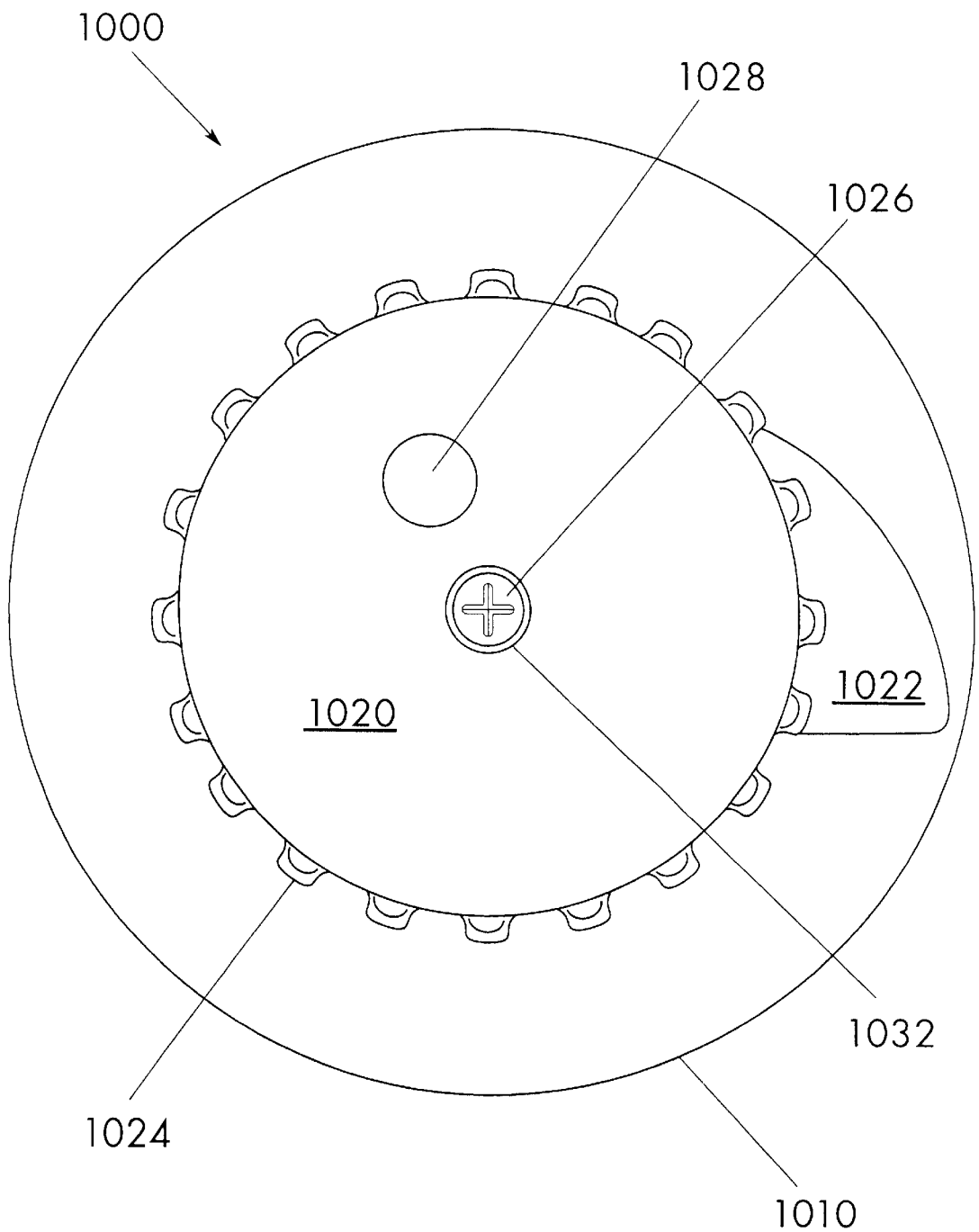
FIG. 2 is a top view of the cap assembly of the FIG. 1 embodiment.

Cap 1020 optionally comprises a thumb wedge or protrusion 1022 and/or knurls 1024, as shown in FIG. 2. Knurls 1024 mimic those of a traditional metal-capped or crimped soda bottle. Thumb wedge 1022 and knurls 1024 facilitate rotation of cap 1020. Thumb wedge 1022 may also help a user grasp the bottle 1010 or other item to which cap 1020 is attached.

A side, cross-sectional view of bottle 1010, is shown in FIG. 1. The cap base comprises an aperture 1110 (preferably circular) for removal of material from bottle 1010. Cap assembly comprises an approximately 270 degree pie-shaped, recessed region 1120 for housing, in part, a spring 1116. Cap 1020 further comprises an aperture 1028 (preferably circular) therein. When a user wants to remove material from bottle 1010, the user rotates cap 1020 to align off-center aperture 1028 with aperture 1110 in cap 1020. In the embodiment shown, alignment of the cap and bottle apertures 1028, 1110 is achieved, for example, by rotating cap 1020 in a counter-clockwise direction about the axis of screw 1026. An o-ring 1114, seated in an annular recess 1113, is used to minimize undesirable migration of material from bottle 1010. Annular recess 1113 surrounds aperture 1110 of bottle 1010. O-ring 1114, is seated therein, forming a seal between cap 1020 and bottle 1010.

Screw 1026 fixes cap 1020 to the cap base or bottle 1010. Screw 1026 passes through central aperture 1032 of cap 1020 and is secured in a cylindrical opening 1112, which is defined by a cylindrical wall 1111. Cylindrical wall 1111 further serves as a post around which spiral-wound spring 1116 is seated. As shown in FIG. 1, part of o-ring 1114 extends over part of spring 1116; this arrangement helps to secure spring 1116 around cylindrical post 1111. Spring 1116 is positioned within the cap assembly to keep cap 1020 in a closed position; thus, force must be applied to cap 1020 to align cap aperture 1028 with bottle aperture 1110, and thus allow the user to remove material from bottle 1010. Thus, the term "self sealing cap" is used to describe the present invention. This self sealing is particularly important when a flowable confectionery is disposed within bottle 1010.

Figure 3:
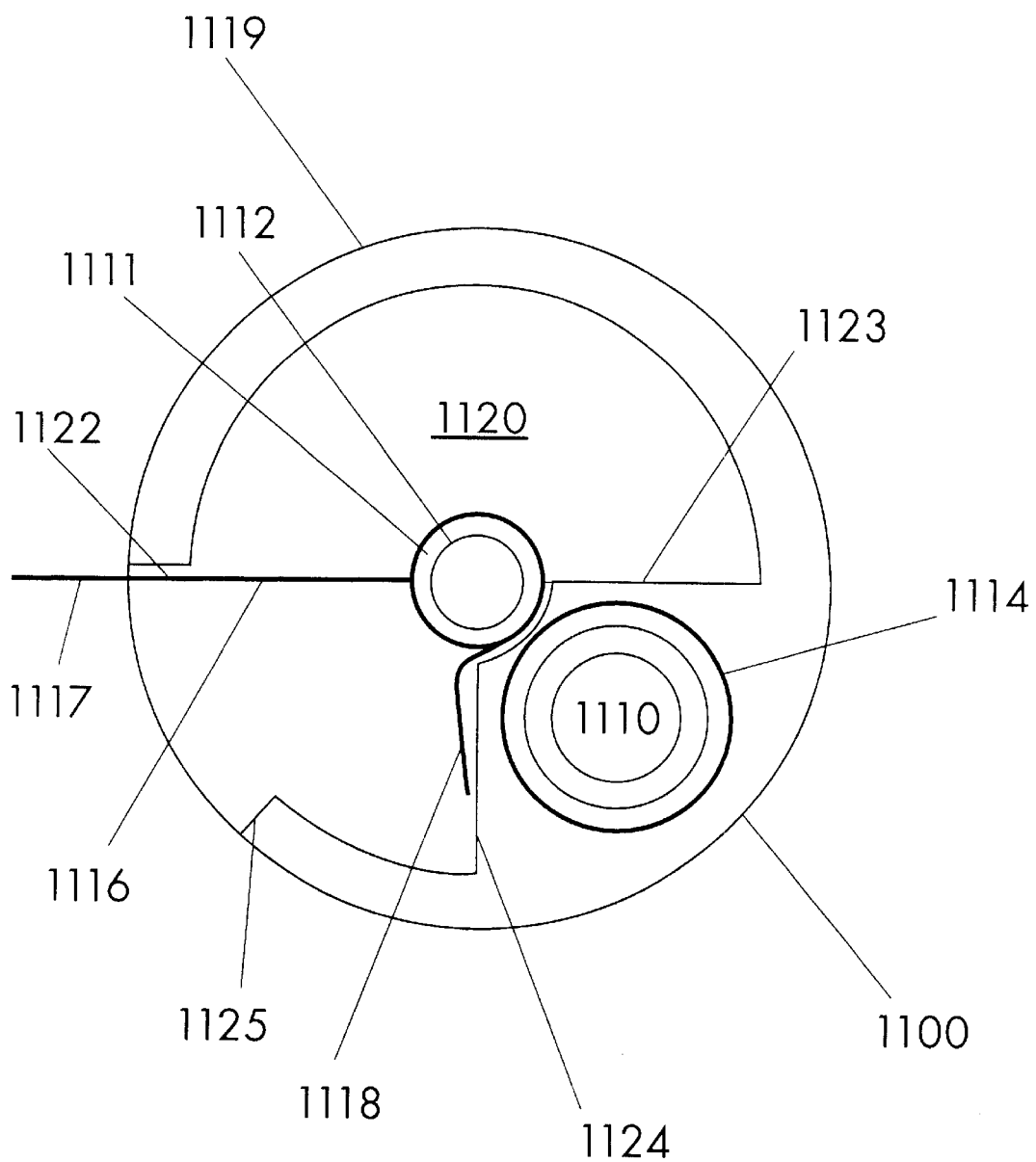
FIG. 3 is a top view of the cap base of the FIG. 1 embodiment.

Referring to FIG. 3, a top view of cap base or bottle 1010 is shown. The cap base shown herein has a 360 degree reference system having 0 degrees and 180 degrees defined along a horizontal axis from right to left and 90 degrees and 270 degrees defined along a vertical axis from to top to bottom. As shown in FIG. 3, recessed region 1120 comprises an approximately 270 degree pie-shape. Cylindrical opening 1112, defined by cylindrical wall 1111, is located at the center of this recessed region 1120. Recessed region 1120 comprises two internal walls that both start from a radius just greater than the radius of cylindrical wall 1111. One of the walls is located at approximately 0 degrees 1123 (0 degree wall) and the other located at approximately 270 degrees 1124 (270 degree wall). These two walls extend radially and terminate against a rim 1119. Rim 1119 surrounds recessed region 1120, except for an approximately 45 degree cutout section 1125. The cutout section is bounded/defined by two walls or stops, one at approximately 180 degrees 1122 (180 degree stop) and another at approximately 225 degrees 1125 (225 degree stop).

In the preferred embodiment, spring 1116 comprises a long end 1117 and a short end 1118. Long end 1117 extends from the spring's spiral core and is seated in a channel 1034 in the cap's thumb wedge 1022. This end 1117 is biased directly or indirectly against the 180 degree stop 1122 of rim 1119. Short end 1118 also extends from the spiral core of spring 1616 and is biased against the 270 degree stop 1124 of recessed region 1120. Thus, application of force to rotate cap 1020 in a counter-clockwise direction causes long end 1117 of spring 1116 and consequently, the cap 1020. In the preferred embodiment, rotation of cap 1020 to the 225 degree stop 1125 results in alignment of cap aperture 1028 and bottle aperture 1110, in an open position. Once the applied force is released, tension in spring 1616 causes long end 1117 of spring to sweep in a clockwise direction towards the 180 degree stop 1122 to close cap 1020, in a resting position.

Figure 4:
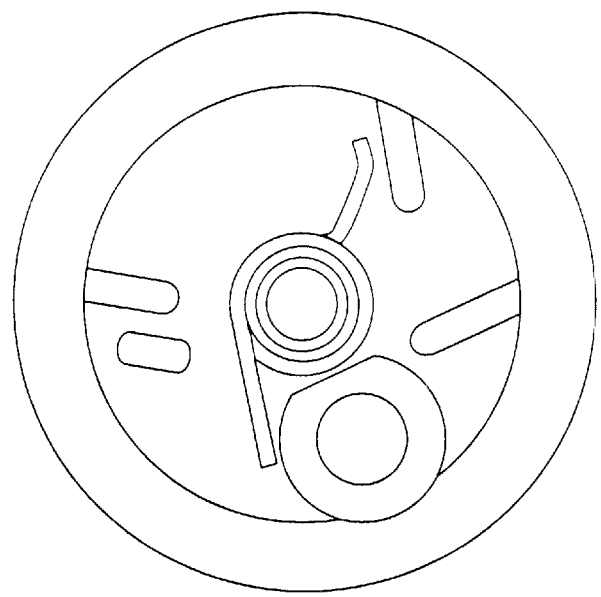
FIG. 4 is a perspective view of the cap assembly of FIGS. 2 and 3.
Figure 4:
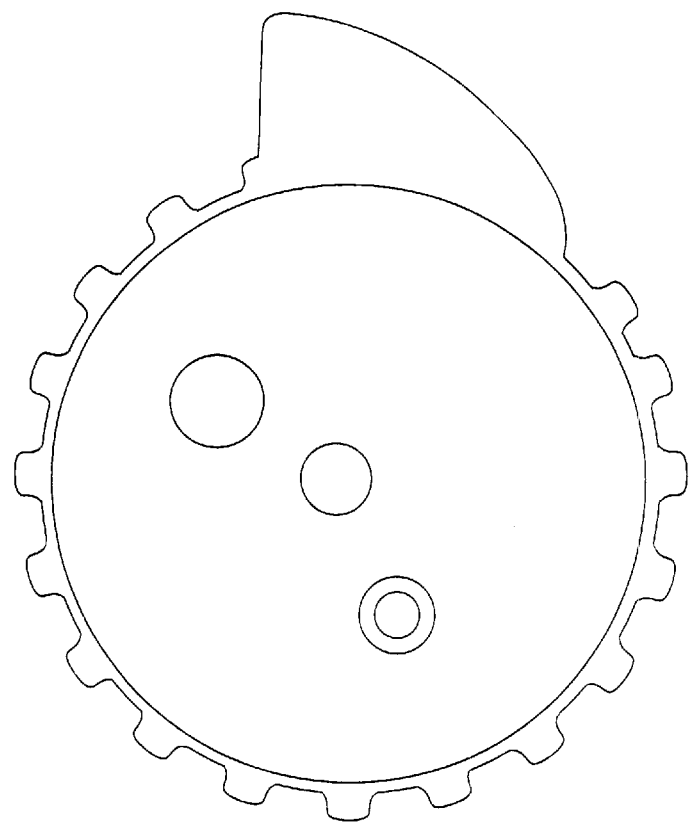

FIG. 4 shows a perspective and sectional view of portions of the upper (turned over) and lower embodiment of the cap assembly of the present invention.

Although the invention has been described in detail with particular reference to these preferred embodiments, other embodiments can achieve the same results. Variations and modifications of the present invention will be obvious to those skilled in the art and such variation and modifications are covered in this disclosure to the extent that they are modifications and/or equivalents. The entire disclosures of all references, applications, patents, and publications cited above are hereby incorporated by reference.

What is claimed is:

1. A self sealing cap for covering and providing an opening to an object, said cap comprising:
   a cap assembly disposable on the object, said cap assembly comprising a central body, an aperture for opening into the object and a spring and an extension extending sideways and horizontally from and beyond said central body;

said cap assembly further comprising a central post around which said spring is spirally disposed;

said spring comprising a first arm and a second arm extending from said central post;

said cap assembly further comprising a third spring stop engageable with said second spring arm;

said cap assembly comprising a first spring stop engageable with said first spring arm and second spring stop;

said cap assembly having a resting position wherein said aperture is closed, and said first spring arm is engaged with said first spring stop and said second spring arm is engaged with said second spring stop;

said cap assembly having an open position wherein said aperture is opened by rotating said extension and said first spring arm is engaged with said first spring stop and said second spring arm is rotated to and engaged with said third spring stop to stop the rotation;

said cap assembly rotatable by a user exerting force on said extension and thereby said cap assembly from said resting position to said open position to open said aperture to allow material from the object to pass through said object opening and said cap assembly aperture; and said spring providing automatic counter rotation of said extension and said cap assembly back to said resting position to thereby close said aperture after a user removes force from said cap extension.

2. The self sealing cap of claim 1 wherein said object comprises a bottle.

3. The self sealing cap of claim 1 wherein said cap assembly aperture is circular.

4. The self sealing cap of claim 1 wherein said cap assembly is attached to said object.

5. The self sealing cap of claim 1 wherein said extension further comprises a thumb wedge.

6. The self sealing cap of claim 5 wherein one end of said spring is disposed in said thumb wedge.

7. The self sealing cap of claim 1 wherein said cap assembly further comprises knurls.

8. The self sealing cap of claim 1 wherein said cap assembly is rotatable about a central axis of said cap.

9. The self sealing cap of claim 1 wherein said spring is housed in a recess in said cap assembly.

10. The self sealing cap of claim 1 further comprising a seal between said object and said cap assembly.

11. The self sealing cap of claim 10 wherein said seal comprises an O-ring about said aperture.

12. The self sealing cap of claim 1 further comprising said object, wherein said object comprises an opening therein and is attachable to said self sealing cap.

13. The self sealing cap of claim 12 wherein said object opening is a top of said object.

14. The self sealing cap of claim 12 wherein said object opening is to a side of a longitudinal axis of said object.

15. The self sealing cap of claim 12 wherein said cap assembly is integral with said object.

16. The self sealing cap of claim 12 wherein said object opening is circular.

17. The self sealing cap of claim 12 wherein a central axis of said cap is coaxial with a central longitudinal axis of said object.

18. The self sealing cap of claim 1 wherein said central body comprises a stationary portion and a movable portion and said extension is attached to and extends beyond said movable portion, so that when said extension is rotated, said movable portion is also turned about said stationary portion.

19. A self sealing cap for covering and providing an opening to an object, said cap comprising:

an object comprising an object opening therein;

a cap assembly disposed on said object, said cap assembly comprising:
    a central body comprising a central axis;
    an aperture to a side of said central axis;
    a spring comprising a first spring arm and a second spring arm;
    a central post around which said spring is spirally disposed and said first spring arm and said second spring arm extending therefrom;
    a first spring stop, a second spring stop and a third spring stop;
    said first spring arm engageable with said first spring stop;
    said second spring arm engageable with said second spring stop in a resting position;
    said second spring arm engageable with said third spring stop when rotated thereto in an open position;
    a thumb wedge extending horizontally beyond said central body;
    said cap assembly and said object having a resting position wherein said object opening is closed and said first spring arm is engaged with said first spring stop and said second spring arm is engaged with said second spring stop;
    said cap assembly and said object having an open position when said object opening is opened through rotation of said cap assembly aperture and said first spring arm is engaged with said first spring stop and said second spring arm is rotated to and engaged with said third spring stop to stop the rotation;
    said cap assembly rotatable about said central axis by a user exerting force on said thumb wedge from said resting position about said object to said stop to align said object opening with said cap assembly aperture in said open position to allow material from said object to pass through both said object opening and said cap assembly aperture; and
    said spring providing automatic counter rotation of said cap assembly back to said second spring stop and said resting position to thereby close said object opening after the user removes force from said thumb wedge.

20. The self sealing cap of claim 19 wherein said object comprises a bottle.

21. The self sealing cap of claim 19 wherein said object opening is a top of said object.

22. The self sealing cap of claim 19 wherein said object opening is to a side of a longitudinal axis of said object.

23. The self sealing cap of claim 19 wherein said object opening is circular.

24. The self sealing cap of claim 19 wherein said cap assembly aperture is circular.

25. The self sealing cap of claim 19 wherein said central body comprises a stationary portion and a movable portion and said thumb wedge is attached to and extends beyond said movable portion, so that when said thumb wedge is rotated, said movable portion is also turned about said stationary portion.

* * * * *